US005970098A

United States Patent [19]
Herzberg

[11] Patent Number: 5,970,098
[45] Date of Patent: Oct. 19, 1999

[54] MULTILEVEL ENCODER

[75] Inventor: Hanan Herzberg, Morganville, N.J.

[73] Assignee: Globespan Technologies, Inc., Red Bank, N.J.

[21] Appl. No.: 08/944,941

[22] Filed: Oct. 2, 1997

Related U.S. Application Data

[60] Provisional application No. 60/046,806, May 2, 1997.

[51] Int. Cl.[6] .......................... H04L 23/02; H04L 25/34; H04L 27/36

[52] U.S. Cl. .......................... 375/264; 375/286; 375/298; 375/262

[58] Field of Search .................................... 375/264, 262, 375/261, 286, 295, 298; 332/103; 341/56; 714/755, 758, 786, 790, 792, 794, 795, 809, 810

[56] References Cited

U.S. PATENT DOCUMENTS

| | | | |
|---|---|---|---|
| 5,305,352 | 4/1994 | Calderbank et al. | 375/261 |
| 5,659,579 | 8/1997 | Herzberg | 375/262 |
| 5,844,922 | 12/1998 | Wolf et al. | 714/792 |

OTHER PUBLICATIONS

High–Rate Punctured Convolutional Codes for Soft Decision Viterbi Decoding, IEEE Transactions on Communications, vol. Com–32, No. 3, Mar. 1984.

On the Spectrum of Distances of a Multilevel Code, Decoded by a Multistage Decoder, Hanan Herzberg, IEEE Transactions on Information Theory, vol. 43, No. 5, Sep. 1997.

*Primary Examiner*—Stephen Chin
*Assistant Examiner*—Betsy L. Deppe
*Attorney, Agent, or Firm*—Thomas, Kayden, Horstemeyer & Risley

[57] ABSTRACT

A improved multilevel encoder and associated method is described. The encoder includes a device (e.g., serial to parallel converter) for presenting a plurality of information bits in parallel format. A symbol selector having a plurality of inputs and an output, the symbol selector being configured to output a symbol that is defined by a signal constellation, whereby the symbol is defined by a magnitude and phase that are uniquely associated with a state of the plurality of inputs. A first encoder has an input and an output, the input of the first encoder being associated with at least one of the outputs of the device and the output being associated with at least one of the inputs of the symbol selector, the first encoder configured by a code defining a four-way set partition of the signal constellation. A second encoder has an input and an output, the input of the second encoder being associated with at least one of the outputs of the device and the output being associated with at least one of the inputs of the symbol selector, the second encoder configured by a code defining a two-way set partition of the signal constellation.

21 Claims, 10 Drawing Sheets

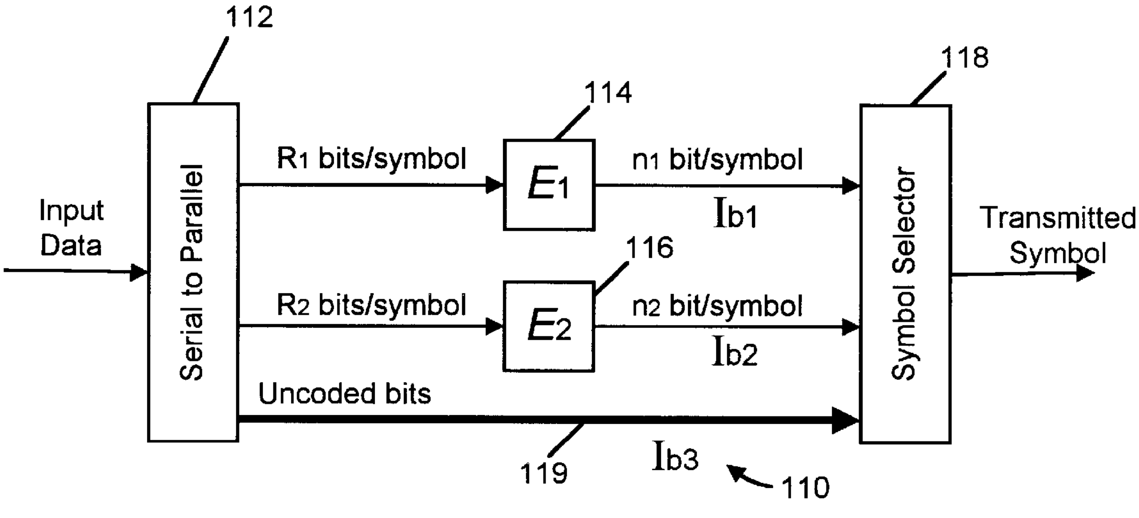
FIG. 7A
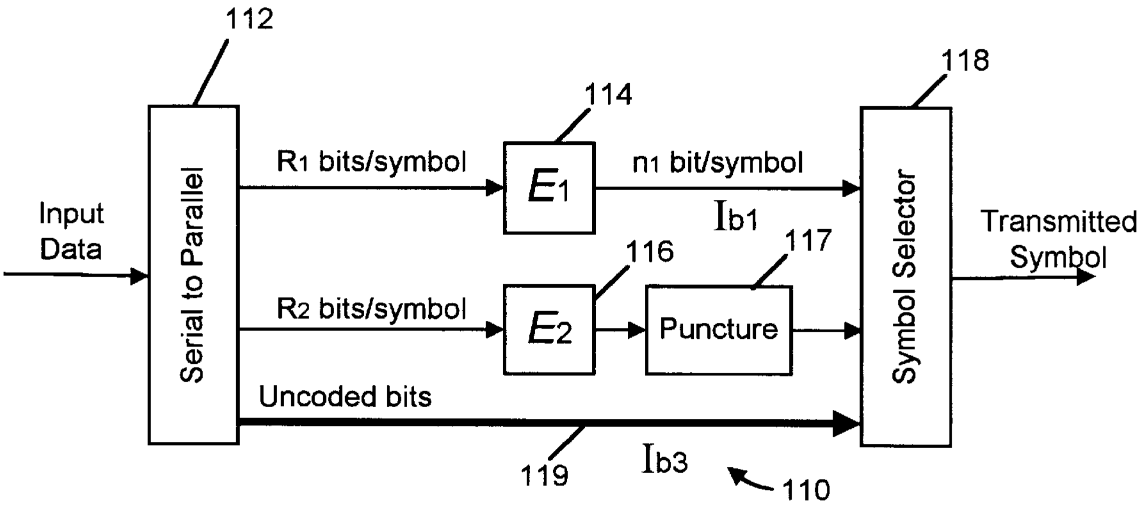
FIG. 7B
$$\begin{bmatrix} 1 & 1 & 0 & 0 & 0 & 1 & 1 & 0 & 0 & 0 & 1 & 0 & 0 \\ 1 & 0 & 1 & 1 & 1 & 0 & 0 & 1 & 1 & 1 & 0 & 1 & 1 \end{bmatrix}$$
FIG. 7C At the first Partition Level:

o -- Ib1 = 00 x -- Ib1 = 10 v -- Ib1 = 01 u -- Ib1 = 11

MULTILEVEL ENCODER

CROSS-REFERENCE TO RELATED APPLICATIONS

This application claims the benefit of U.S. Provisional Applications Ser. No. 60/046,806, filed May 2, 1997, and entitled Powerful Multi-level Coding Scheme for Single Pair HDSL.

BACKGROUND OF THE INVENTION

1. Field of the Invention

The present invention generally relates to systems for signal coding, and more particularly to a signal coding system utilizing a unique multilevel coding method for achieving improved bit error rates.

2. Discussion of the Related Art

As is known, many modems communicate digital data over an analog medium by mapping the data onto analog signals. Many sophisticated modems communicate digital information by mapping the data onto analog signals and, thereafter, modulating an analog carrier with those signals. Typically, a collection of bits are combined form a two-dimensional symbol, which symbol components are converted to analog form, and the analog-form components respectively modulate a carrier and a quadrature replica of the carrier. The two modulation products are added and filtered, and the result is applied to the transmission medium. A remote modem receives the signal, samples it, identifies the magnitudes and phases of the analog samples, converts the samples to symbols, and finally recovers the original bits of data. What these modems do, in effect, is encode the digital signals onto a two dimensional symbol constellation that is modulated onto a carrier.

Due to noise, imperfect channel conditions, and other factors that are known, there should be a way to help ensure the proper communication of signals across a transmission channel. In this regard, signal coding, or channel coding, has long been know as a way to protect the integrity of data transmitted through a channel. Through the implementation of coding, unsystematic redundancy can be removed from message signals so that channels can be used with maximum efficiency. In addition, through the use of coding, systematic redundancy can be introduced into the transmitted signal so that errors caused by noisy channels can be corrected. Stated another way, the ability to detect and/or correct errors resulting from a noisy transmission channel can only be provided by the additional transmission of redundant bits, and thus by lowering the effective information rate for a given transmission bandwidth.

A fundamental axiom which has motivated the development of coding methods, known as Shannon's coding theorem, provides that if a source generates information at a rate that is less than the capacity of a transmission channel, there exists some encoding procedure that will permit the source output to be transmitted through the channel with an arbitrarily small probability of error. Multilevel coding of signals is one coding method known for achieving increased transmission speeds. However, multilevel signals are more likely to be corrupted by channel noise. Therefore, error-correcting schemes are generally implemented in systems having multilevel signals.

One example of a multilevel coding system is presented in U.S. Pat. No. 5,659,579, invented by the inventor of the present invention. The system disclosed in that patent recognized the fact that some components of a symbol are more susceptible to errors (due to noise) than other components. Accordingly, those more susceptible components (e.g., least significant bits) are encoded more robustly than other components.

As is known, system design is largely performed by making a number of tradeoffs. For example, error detection and correction capability may be added to a system at the expense of added redundancy. Although the amount of information communicated is constant, more actual data is communicated. Likewise, as the encoder design becomes more intense or robust, system complexity is increased. In multilevel systems, additional protection may be obtained through additional coding layers. However, additional coding layers add delay to the system at the receiver/decoder.

Accordingly, there is a need for a system that provides improved performance through coding, while minimizing the system drawbacks or tradeoffs that must be made.

SUMMARY OF THE INVENTION

Accordingly, it is a primary aim of the present invention to provide a coding system achieving improved efficiencies. Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an improved system and method for coding an information signal. In accordance with one aspect of the invention, an encoder provides a multilevel encoded signal. The encoder includes a device (e.g., serial to parallel converter) for presenting a plurality of information bits in parallel format. A symbol selector having a plurality of inputs and an output, the symbol selector being configured to output a symbol that is defined by a signal constellation, whereby the symbol is defined by a magnitude and phase that are uniquely associated with a state of the plurality of inputs. A first encoder has an input and an output, the input of the first encoder being associated with at least one of the outputs of the device and the output being associated with at least one of the inputs of the symbol selector, the first encoder configured by a code defining a four-way set partition of the signal constellation. A second encoder has an input and an output, the input of the second encoder being associated with at least one of the outputs of the device and the output being associated with at least one of the inputs of the symbol selector, the second encoder configured by a code defining a two-way set partition of the signal constellation.

In accordance with a preferred embodiment of the present invention, at least one of the encoder outputs may be directly connected (electrically) to an input of the symbol selector. Preferably, the signal constellation is a 64 point CAP constellation, but may be a quadrature amplitude modulation (QAM) or may be a constellation of a different size. In one embodiment, the first encoder is a rate-half encoder, but may be a different rate as well. Likewise, the second encoder is a rate-half encoder as well. In accordance with the preferred embodiment, the multilevel encoder further includes a puncture block disposed between the output of the second encoder and the symbol selector. As the name implies, the block is configured to "puncture" the output of the second encoder. Specifically, the operation of puncture block is defined by a matrix of "1"s and "0"s, wherein a "1" indicates that a bit input to the puncture block is transmitted at the output, while a "0" inhibits the transmission of the bit input to the block. Collectively, the rate of the puncture block and the second encoder is 13/14.

Consistent with the concepts and teachings of the present invention, a puncture block may be added to the first encoder, as well as the second encoder. This may be done for a variety of reasons. For example, as can be readily verified, the two-level encoder of the preferred embodiment realizes approximately 4.9 bits per symbol. It may be desired to add a puncture block to the first encoder in order to achieve 5 bits per symbol.

In accordance with another aspect of the invention, a method is provided for encoding signals for transmission across a communication channel. In accordance with the preferred embodiment, the method includes the step of providing a plurality of information bits in parallel format for communication to a symbol selector. It further includes the steps of directing a first group of the bits to a first encoder and directing a second group of the bits to a second encoder. Bother the first and the second encoder have at least one output that is directed to the symbol selector. The method further includes the steps of performing a four-way partition on the first group of bits, and performing a two-way partition on the second group of bits.

DESCRIPTION OF THE DRAWINGS

The accompanying drawings incorporated in and forming a part of the specification, illustrate several aspects of the present invention, and together with the description serve to explain the principles of the invention. In the drawings:

FIG. 7A is a block diagram illustrating a multilevel encoder constructed in accordance with the present invention;

FIG. 7B is a block diagram similar to FIG. 7A, but further illustrating the incorporation of a puncture block associated with the second encoder of a multilevel encoder, in accordance with an alternative embodiment of the invention;

FIG. 7C is a matrix of values defining the puncture block illustrated in FIG. 7B;

DETAILED DESCRIPTION OF THE PREFERRED EMBODIMENT

Figure 1:
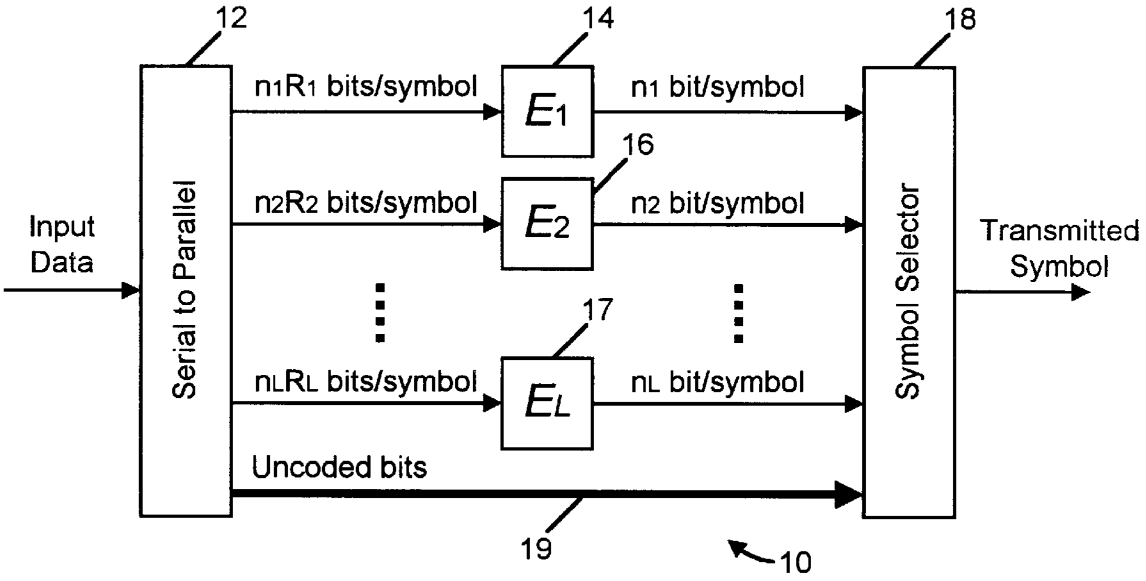
FIG. 1 is a block diagram illustrating a multilevel encoder, as is known in the prior art.

Having summarized the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Background on Multilevel Encoding and Multistage Decoding

Before discussing the preferred embodiment of the present invention, a background on multilevel encoding and multistage decoding will first be provided. In this regard, reference is made to FIG. 1, which is a block diagram illustrating the structure of a simple multilevel encoder 10. The illustrated encoder is an L level encoder having a serial to parallel converter 12 at the front end. As is known, the serial to parallel converter 12 includes an input and a plurality of outputs. Most of the outputs are associated with, and directed to an encoder 14, 16, 17. Each of the encoders 14, 16, 17 will receive one or more bits for encoding, and output the encoded bits to a symbol selector 18. As illustrated, uncoded bits may be communicated directly from the serial to parallel converter 12 to the symbol selector 18 across one or more lines 19.

Figure 2:
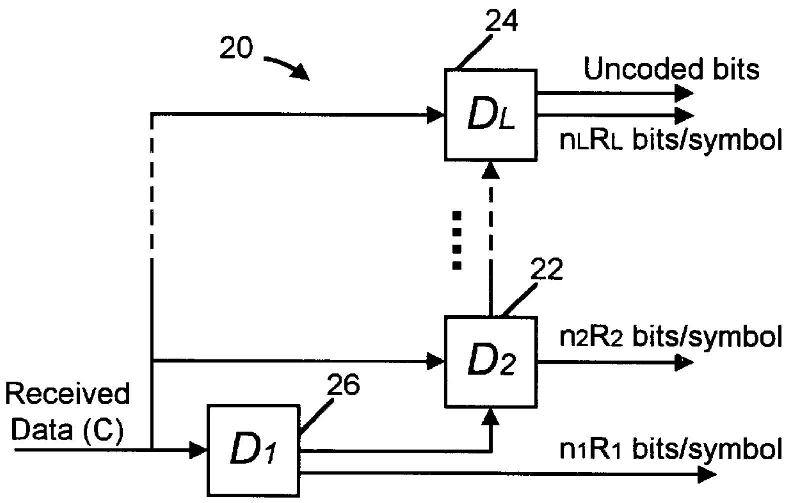
FIG. 2 is a block diagram illustrating a multistage decoder, as is known in the prior art.

Multilevel coding has been recognized as an efficient way of combining error correction coding with modulation. Multilevel coding, is generally a combination of several error correction codes applied to subsets of some signal constellation. As is known, a typical code of this kind is, based on a set $S_0$ and an L level partition chain $S_0/S_1 \ldots /S_L$. In the multilevel encoder 10 of FIG. 1, the sequence of bits associated with the partition $S_{i-1}/S_i$ is a codeword of the binary code $C_i(n_i, k_i)$, and $E_i$ is the corresponding encoder. The multilevel code may be made up of convolutional component codes, block codes, or a combination thereof An important parameter of a coded modulation scheme is the computational complexity of the decoder. Usually a kind of suboptimal decoder (e.g., multistage decoder) is used for multilevel codes. An example of a simple multistage decoder 20 is shown in FIG. 2. The decoder 20 employs a separate decoder (e.g., 22, 24, 26) for each of the codes $C_1$, $C_2, \ldots, C_L$. The decoding process starts with the decoding of $C_1$, based on the received signal. The decoding of $C_i$, for i=2, 3, . . . , L is based on the received signal and the estimated codewords of $C_1, C_2, \ldots, C_{i-1}$, without using any information related to the codes $C_{i+i}, \ldots, C_L$.

The multistage decoder 20 is referred to as a suboptimal decoder because, during the decoding of a component code, there is no information regarding the component codes at the higher partition levels. For example, decoder 22 does not have information regarding the component codes output from decoder 24. The lack of this information can lead to an increase in the error coefficient of the code (and other elements in the spectrum of distances as well). Furthermore, errors might propagate through the decoders of the components codes, causing an increase in the average bit error rate (BER). However, the reduction in coding gain, due to suboptimal decoding, is small, whereas the reduction in complexity is substantial.

Figure 3:
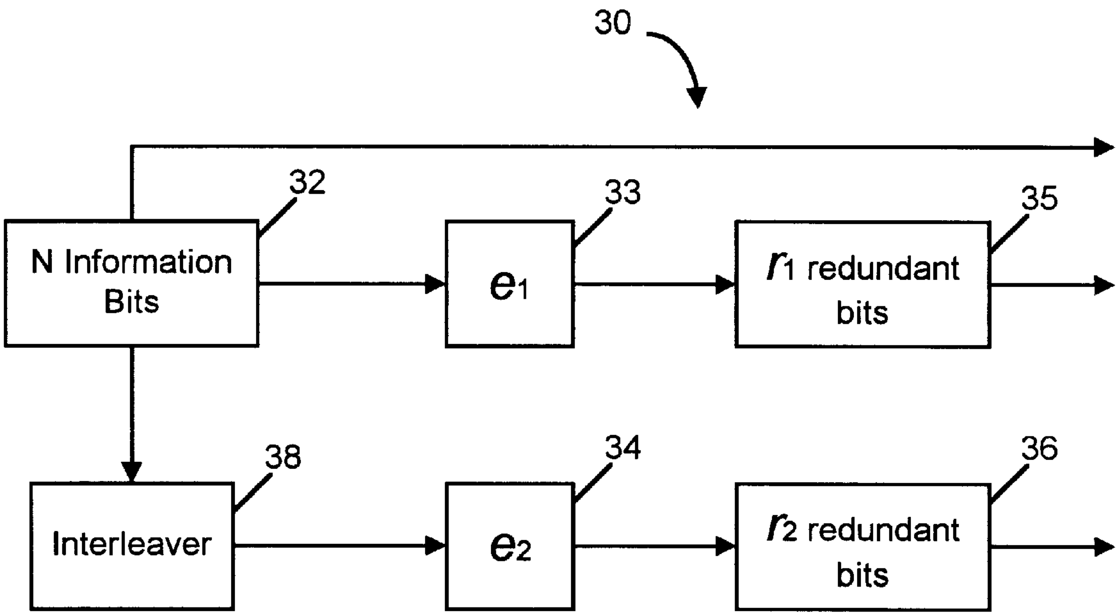
FIG. 3 is a block diagram of a simple two level encoder for generating a parallel concatenated code, as is known in the prior art.

Reference is now made to FIG. 3, which is a block diagram of a simple parallel concatenated encoder 30. In this encoder, a block 32 of N bits is encoded twice, once by the encoder $e_1$ 33 (note that the notation $E_1$ is reserved for the multilevel encoder) in order to produce a codeword of $c_1$, and again, after interleaving, by the encoder $e_2$ 34, in order to produce a codeword of $c_2$. The encoders 33 and 34 create two blocks 35 and 36 of r1 and r2 redundant bits, respectively. It should be appreciated that more than two encoders 33, 34 can be used. However, additional encoders will generally require an additional interleaver 38, for each additional encoder. Thus, N encoders will generally require N-1 interleavers. Furthermore, there is generally no restriction to use different encoders, and frequently $c_1$ and $c_2$, are the same binary codes. These codes may be block or convolutional codes. When a memoryless channel (e.g., AWGN channel) is used, the order of the transmitted bits is not important—e.g., each information bit can be followed by a redundant bit.

The encoder 30 shown in FIG. 3 creates a $(N+r_1+r_2, N)$ block code, where $N+r_1+r_2$ is the length of this code. Since the information bits are transmitted only once, and are part of the codewords, $e_1$ and $e_2$ must be systematic encoders. In case of block codes it is straightforward to construct a systematic encoder, many widely used block codes the generator matrix of the systematic code are well known. Note that a codeword of a parallel concatenated code consists of several codewords of $c_1$ and $c_2$.

Figure 4A:
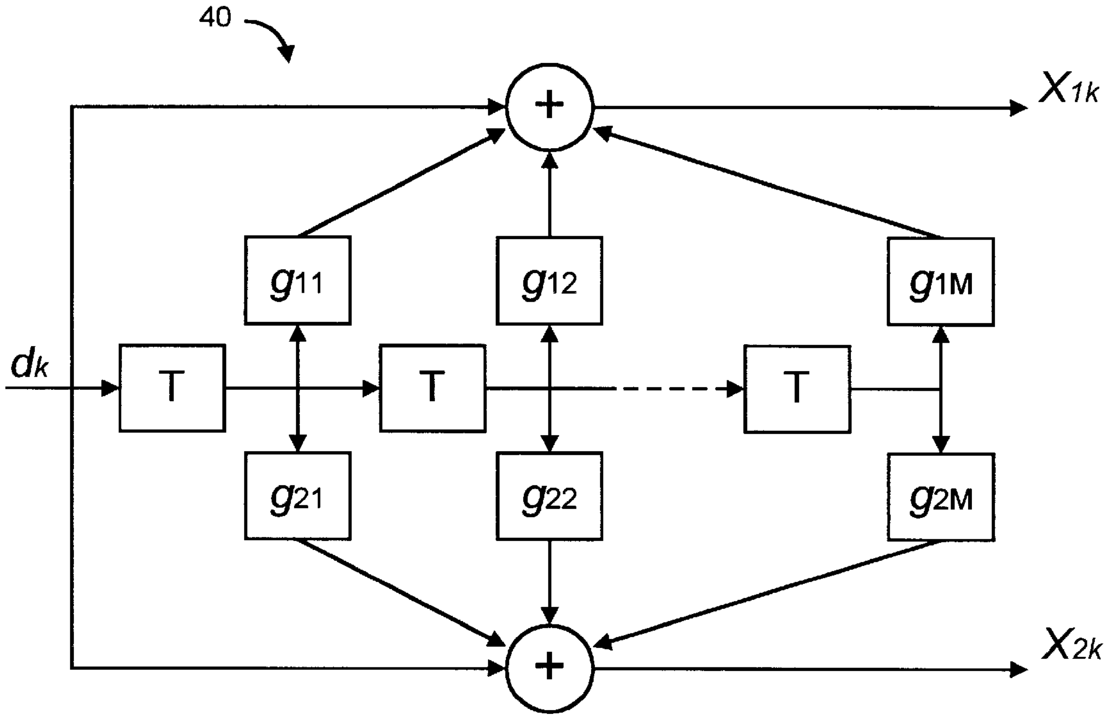
FIG. 4A is a block diagram of a non-systematic convolutional encoder, as is known in the prior art.
Figure 4B:
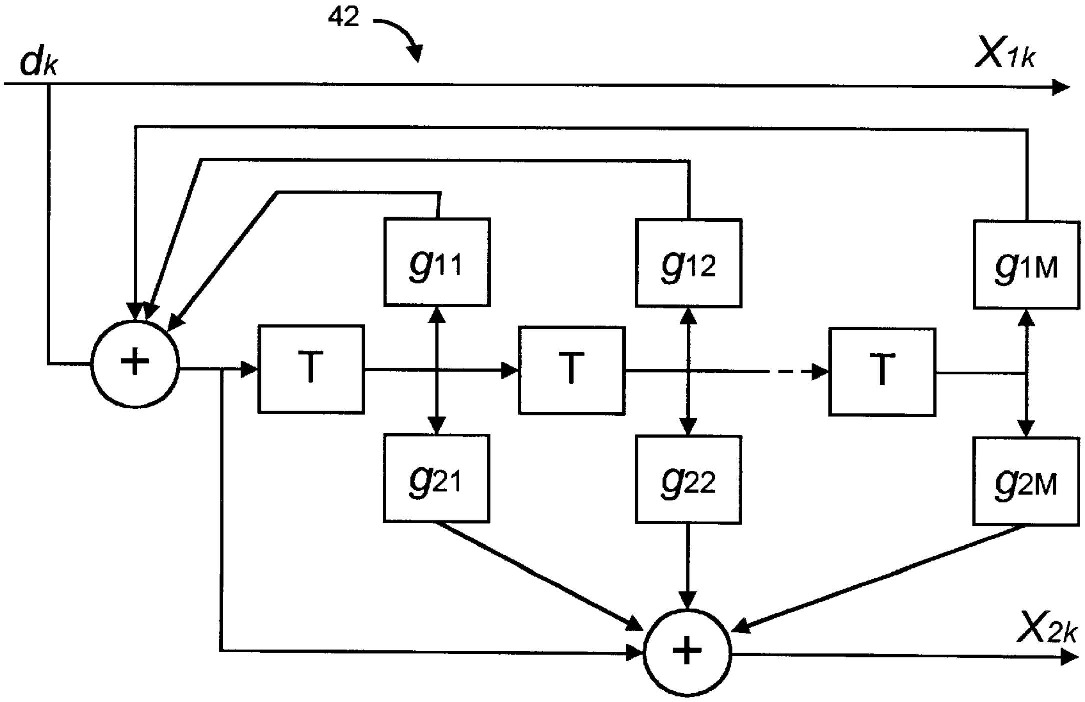
FIG. 4B is a block diagram of a systematic convolutional encoder, as is known in the prior art.

Reference is now made to FIGS. 4A and 4B, which illustrate a non-systematic convolutional encoder 40 and a systematic convolutional encoder 42, respectively. Convolutional codes are conventionally implemented in a non-systematic form, as shown in FIG. 4A, where $G_1$ $\{g_{1i}\}$ and $G_2$ $\{g_{2i}\}$ are the generators of the rate-half encoder. In the recursive systematic encoder of FIG. 4B, the input is divided by $G_1$ and multiplied by $G_2$.

It will be appreciated that both systematic and non-systematic encoders generally have the same trellis structure. However, the outputs produced by these encoders are different, even though the input provided to both encoders is the same. For instance, if the sequence (. . . 0 0 1 0 0 . . .) is provided to the non-systematic encoder of FIG. 4A, then the outputs $X_{1k}$ and $X_{2k}$ have a finite number of bits with the value "1" (this number is determined by the constrain length of the code). On the other hand, if the same sequence is provided to the systematic encoder, then a large number (generally limited by N) of bits with the value "1" will be provided at the output $Y_{1k}$. As is known the nonsystematic 40 and the systematic 42 encoders are a finite impulse response (FIR) and an infinite impulse response (IIR) systems, respectively. This property of the recursive systematic code makes it an important ingredient in the design of parallel concatenated codes, where the performance strongly depends on the spectrum of Hamming distances of codewords with small Hamming weight in the information block. It will be appreciated that the Hamming weight of a codeword refers to the number of "1"s in the codeword, where the Hamming distance between two codewords refers to the number of changed symbols (from "0" to "1" or from "1" to "0") in two codewords.

A parallel concatenated code can be treated as a block code, even when encoders 33 and 34 of FIG. 3 are convolutional encoders. For instance, if the encoder 42 shown in FIG. 4B is substituted for the encoders 33, 34 of FIG. 3, then a (3N,N) block code with rate ⅓ is obtained . A zero state is assumed at the beginning and at the end of the block. Since the constituent codes are recursive, it is not sufficient to terminate the block by setting the last M bits of a sequence to zero. However, relatively simple methods for trellis termination are well known, as for example in "Turbo Codes for PCS Applications", by D. Divsalar and F. Pollara, Proc of the ICC '95, Seattle, Wash., Jun. 1995, and need not be discussed herein.

From Shannon theory, it is observed that increasing the length of the codeword (or the constraint length in case of a convolutional code) leads to better performance. That is, by adding further redundancy, a lower bit error rate (BER) is generally achieved. However, the complexity of maximum-likelihood (ML) decoding algorithm increases with the length of the codeword. Since codewords of parallel concatenated codes are relatively long, parallel concatenated codes have the potential of being good codes. The performance of a code is determined primarily by the spectrum of Hamming distances, which will be discussed in more detail below. Also, the interleaver (see FIG. 3) plays an important role in determining the performance of a parallel concatenated code. A ML decoding of a parallel concatenated code is impractical, because of the computational complexity involved. By taking the advantage of the structure of a parallel concatenated code, however, the decoding can be broken into simpler decoding steps, such that the total decoding complexity may be made lower than that of a ML algorithm.

Figure 5:
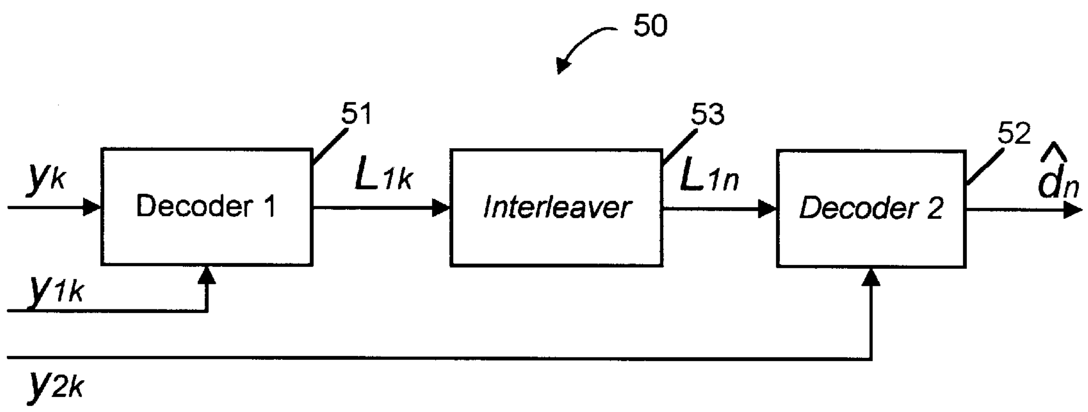
FIG. 5 is a block diagram of a two-stage decoder for decoding a parallel concatenated coded signal, as is generated by the encoder of FIG. 3.

Referring now to FIG. 5, a suboptimal decoder 50 for the parallel concatenated code encoded according to FIG. 3 is presented. This decoder consists of decoders 51, 52 for $c_1$ and $c_2$, and an interleaver 53 which is designed to correspond to the interleaver 38 used in the encoder 30. The inputs to decoder 51 are the received information bits, $y_k$, and the received parity check bits, $y_{1k}$, created by encoder 33. Decoder 51 is a soft in soft out decoder, aimed at providing soft (i.e., weighted) information to decoder 52. It is well known that soft decoding, performed by decoder 52, yields performance that is better than that of hard decoding. For example, if $Pr[d_k i|\text{observation}]$, i=0, 1, be the a posterior probability of the data bit $d_k$, the logarithm of the likelihood ratio (LLR) is the desired output of decoder 51, and is given by:

$$L_{1k} = \log\frac{Pr[d_k = 1 \mid \text{observation}]}{Pr[d_k = 0 \mid \text{observation}]}. \qquad \text{Equation (1)}$$

The maximum a posteriori (MAP) algorithm is the optimal soft in soft out decoder. A modification of Bahl's algorithm is known for the recursive systematic codes. The computational complexity of the MAP algorithm is higher (especially when a long interleaver is used) than that of the Viterbi algorithm, which is unable to provide the desired soft output. Modification to the Viterbi algorithm, called soft output Viterbi algorithm (SOVA), has been suggested in literature, and is known by persons skilled in the art. This algorithm produces information regarding the reliability of the received data. From Equation (1) above, it is easy to see that when the difference between $Pr[d_k=1|\text{observation}]$ and $Pr[d_k=0|\text{observation}]$ is small, the LLR of $L_{1k}$, is close to zero. Such a small difference indicates small reliability of the information related to the k-th bit. If $Pr[d_k=1|\text{observation}] > Pr[d_k=0|\text{observation}]$, then $L_{1k}$ has a positive value, which increases with the reliability of the measurement. Namely, the desired soft output can be approximated by multiplying the hard decision with an estimation for the reliability of the measurement. In the SOVA the reliability is evaluated by measuring the difference between a survivor path and the path that has the closest accumulated metric. As this difference increases the reliability of the measurement increases, since the difference between the accumulated metrics of the survivor path and that of the remaining paths increases.

Figure 6:
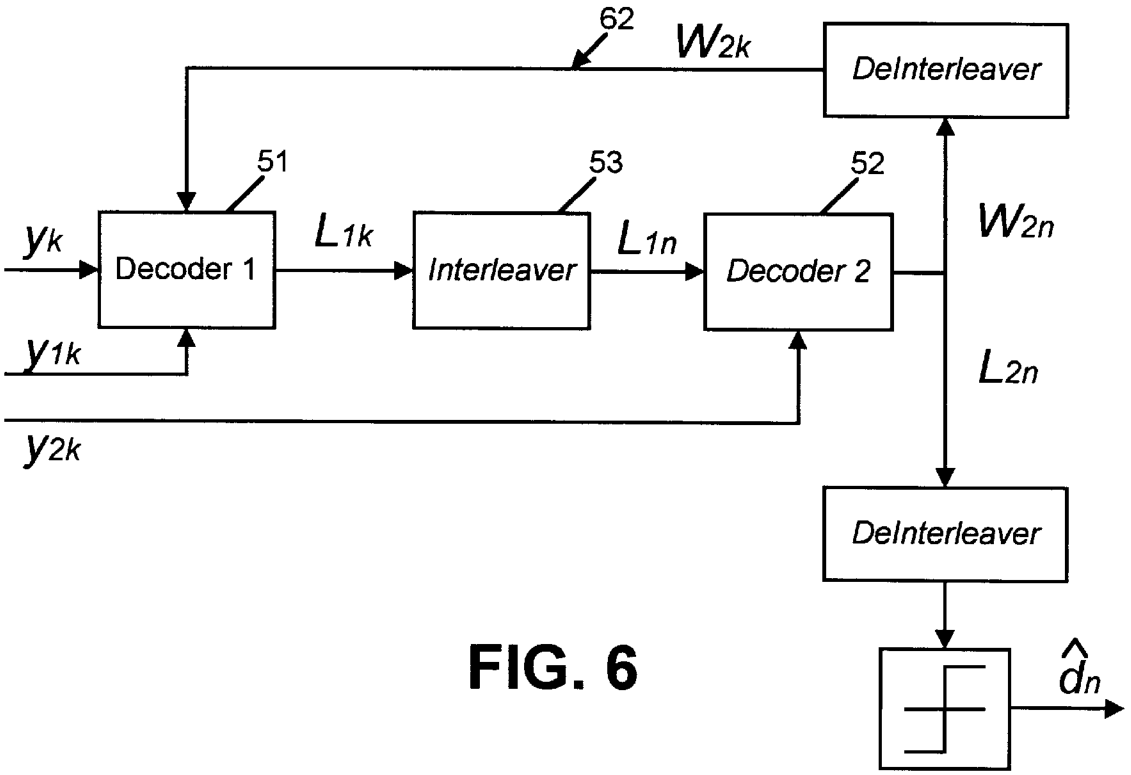
FIG. 6 is a block diagram of a two-state decoder similar to that of FIG. 5, but further employing a feedback loop for improved performance.

As illustrated, decoder 51 in FIG. 5 is not using the data related to the parity check bits of $c_2$. This information is instead utilized by decoder 52, which performs a soft decision. The foregoing decoding algorithm is not optimal, since decoder 51 is not using all the available information (e.g., not using $y_{2k}$). Accordingly, the performance can be improved by substituting decoder 52 for a soft output decoder, similar to decoder 51. The soft output corresponding to the k-th information bit can be expressed in a sum of the input $Y_k$ and an extrinsic information, denoted by $W_k$ (See FIG. 6). The extrinsic information is a function of the redundant information introduced by the encoder. Namely, $W_k$ represents the improvement (due to the parity check bits) obtained in the soft output. By using a feedback loop 62, the extrinsic information produced by decoder 52 is available to decoder 51 (see FIG. 6). The additional information provided by the feedback loop 62 improves the performance of decoder 51, and consequently the performance of decoder 52 (i.e., the decoder's output). Using computational methods that are known, it can be deduced that the iterative decoder presented in FIG. 6 achieves performance that is close to the Shannon limit (and consequently are close to the performance of ML decoding) after a few iterations.

The Advancement of the Present Invention

Reference is now made to FIG. 7A, which illustrates a two-level encoder 110 constructed in accordance with the present invention. In general, the encoder is of similar form to that illustrated and described in FIG. 1, although FIG. 1 more generically described a multilevel encoder of L layers. The illustrated encoder 110 utilizes a device, such as a serial to parallel converter 112, at the front end to present a plurality of information bits in parallel format. A serial to parallel converter 112 may be utilized, where, for example, the data is received in serial format, and includes an input and a plurality of outputs. A plurality of the outputs are associated with, and directed to an encoder 114, 116. In turn, each of the encoders 114, 116 receive one or more bits for encoding, and output the encoded bits to a symbol selector 118. As illustrated, uncoded bits are preferably communicated from the serial to parallel converter 112 to the symbol selector 118 across one or more lines 119, via direct electrical connection.

In the illustrated embodiment, discussed in more detail below, the symbol selector 118 maps the plurality of information and coded bits into a 64 point signal constellation, preferably utilizing CAP modulation, but may use QAM or other similar modulation techniques as well. Accordingly, six parallel input bits are received at the input of the symbol selector 118, since $64=2^6$. As will be discussed in connection with FIG. 9, the present invention utilizes a unique combination of a four-way set partition and a two-way set partition of the constellation to achieve improved and efficient coding gains.

As previously discussed, an important parameter of a coded modulation scheme is the computational complexity of the decoder. Usually a kind of suboptimal decoder (e.g., multistage decoder) is used for multilevel codes. Thus, as more levels of coding are added, more delay is introduced at the decoder. Therefore, two levels of coding have been selected for the present invention. The first level, in combination with the symbol selector 118 effects a four-way set partition of the signal constellation, improving the coding gain. The second level further improves the coding gain by effecting a two-way set partition. As will be appreciated from the discussion that follows, set partitioning increases the effective Euclidean distance between constellation points, and improves the resulting signal to noise ratio, and thus the coding gain, of the system.

In accordance with the preferred embodiment, two bits are output from the first encoder 114, one bit is output from the second encoder 116, and three bits 119 are uncoded. As will be shown below, the set partitioning performed by the present invention sufficiently increases the Euclidean distances between the constellation points so that, even with three uncoded bits, a coding gain of approximately 6 dB is achieved.

Figure 8:
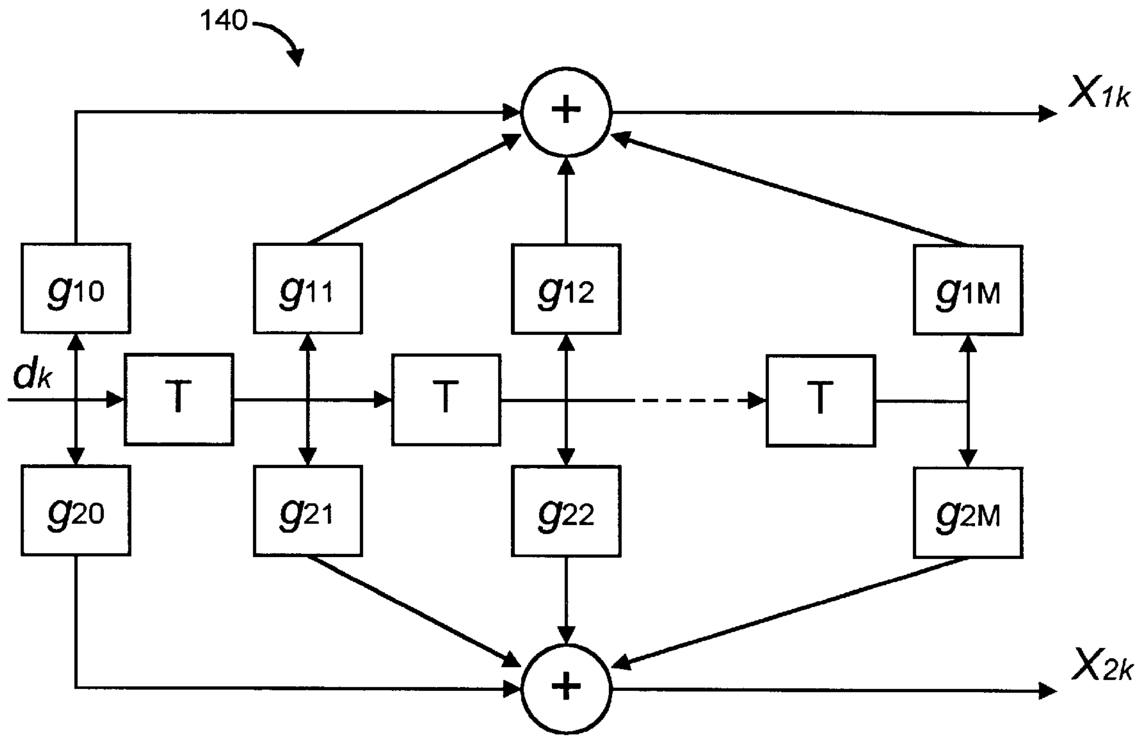
FIG. 8 is a block diagram of the rate-half encoders used for the first and second encoders of the multilevel encoder of FIGS. 7A and 7B.

Reference is now made briefly to FIG. 8, which illustrates the encoder 140 utilized for both encoders 114 and 116 of the preferred embodiment. It will be appreciated, however that the particular encoder structure illustrated is not required for implementing the broad concepts and teachings of the present invention, but is presented for completeness and illustrative purposes. As illustrated, a single bit input $d_k$ is input to the encoder 140, and two outputs $X_{1k}$ and $X_{2k}$ are generated. In this regard, it is recognized that this is a rate-half encoder. Delay elements T are provided, and coefficients g10, g11, . . . , g20, g21, . . . , etc. define the outputs and characteristics of the encoder. The code used for the first partition level, E1, is a non-systematic, rate-half, convolutional code with the generators G1=101110001(561 in octal) and G2=111101011(753in octal), where G1 ={g10, g11, . . . , g19} and $G_2$={g20, g21, . . . g29}. The code $C_2$ is similarly a rate-half convolutional code, with generators G1=101011 (53 in octal) and G2=111101 (75 in octal), wherein G1={g10, g11, . . . g16} and G2={g20, g21, . . . g26}. The code $C_1$, carries one information bit per symbol (rate-half with two transmitted bits per symbol).

Referring now to FIG. 7B, an alternative embodiment of the present invention is shown. Specifically, the embodiment of FIG. 7B is similar to that of FIG. 7A, but further includes a puncture block 117. The puncture block operates to "puncture" the output of the second encoder 116, in accordance with the puncture matrix 130 illustrated in FIG. 7C. As is known, punctured convolutional codes serve to simplify Viterbi decoding, and are obtained by periodically deleting a portion of the bits of low-rate convolutional codes. Indeed, punctured coding techniques not only simplify Viterbi decoding, but also implement a rate-selectable convolutional encoder/Viterbi decoder. Such measures are known in the art and need not be described herein. Furthermore, the operation of punctured codes are known in the art. For example, *High-Rate Punctured Convolutional Codes for Soft Decision Viterbi Decoding*, IEEE Transactions on Communications, Vol. Com32, Mar. 1984, pp. 315–319, hereby incorporated by reference, provides a description of different high-rate punctured codes, as derived from rate-half convolutional codes, and their effect on coding gain.

Since the second encoder 116, like the first encoder, includes two output bits, two bits are input to the puncture block 117. Therefore, the puncture matrix 130 is defined by two rows. The puncture block 117 operates to transmit to its output the output of the encoder 116, for those instances where the value of the transfer matrix 130 is a "1" and to inhibit the output in those instances where the value of the transfer matrix 130 is a "0". As a result, the code output from the puncture block 117 (resulting from the combination of the encoder 116 and puncture block 117) is effectively a 13⁄14 rate code. In case of 64 point CAP constellation the total rate of the multilevel code (number of bits per symbol) is 4.9286.

It will be appreciated that the flow of information (e.g., discrepancy of bit rates output from serial to parallel converter 112 and bits output from encoders 114, 116 and puncture block 117 may be controlled by the addition of buffers (not shown) to buffer additional bits when necessary.

Figure 9:
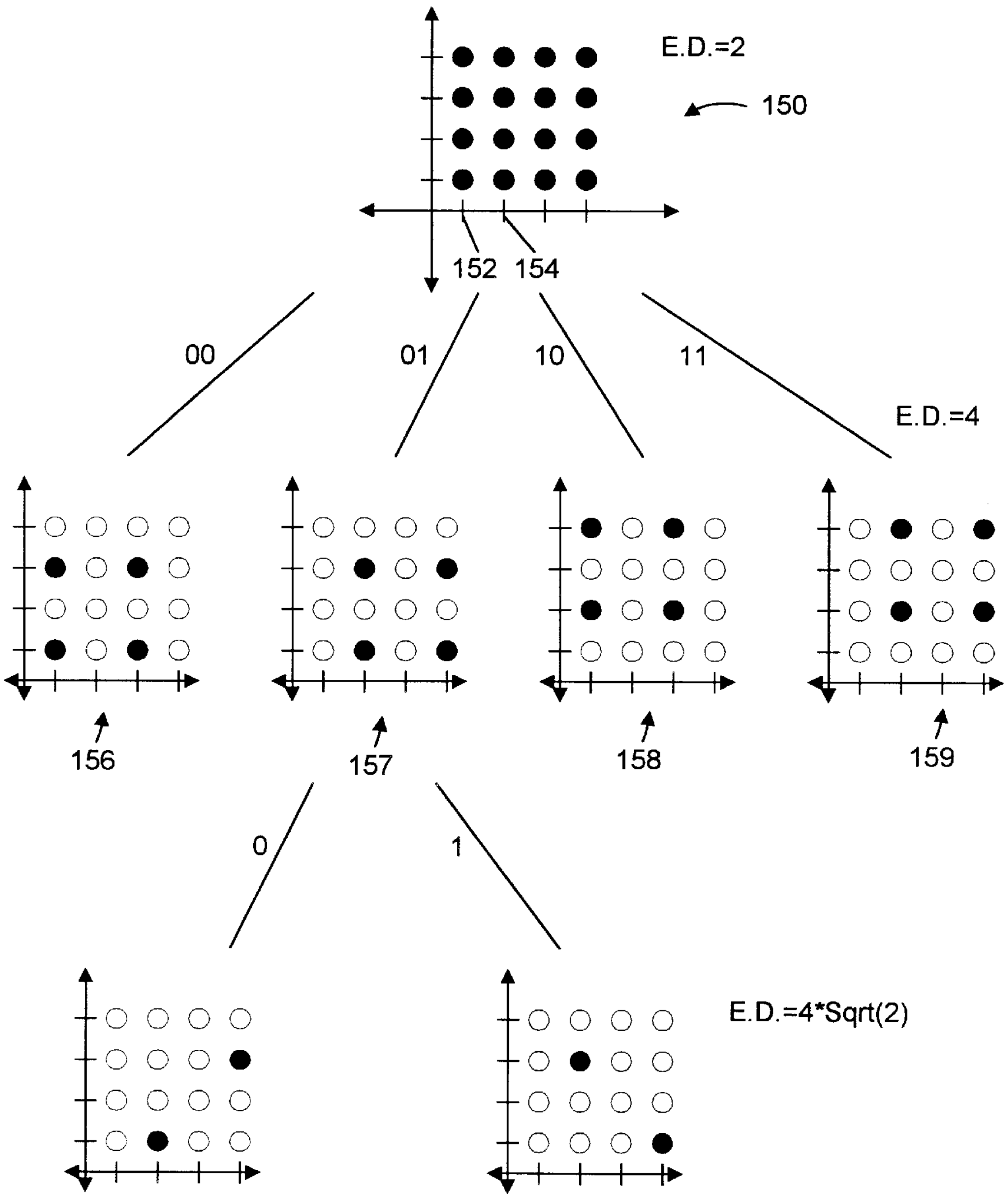
FIG. 9 is a diagram illustrating the four-way constellation partitioning and the two-way constellation partitioning performed on the output bits of the first and second encoders of FIG. 7A, respectively.

Turning now to FIG. 9, the set partitioning performed in accordance with the preferred embodiment of the present invention is illustrated. For purposes of illustration, assume that the signal constellation is a 64 point CAP constellation. One quadrant (16 points) is this constellation is illustrated at 150. It will be appreciated that this same sixteen point pattern is repeated in the other three quadrants. Assuming that the distance separating adjacent axis demarcations 152, 154 is unit two, it is readily verified that the Euclidean distance of separation between adjacent constellation point is two. In order to enhance the coding gain, the two bits (Ib1) output from encoder 114 are used to define a four-way set partitioning in the mapper or symbol selector 118, in the manner illustrated. Specifically, the diagrams 156, 157, 158, and 159 illustrate this four-way set partition. The first level (four-way) partition provides for four signal points in each quadrant, spaced as shown. In this regard, the solid or blackened circles represent the signal points assigned to that particular partition. It is readily verified that the Euclidean distance separating the nearest neighbors of the first partition level is four, and is thus doubled from the non-partitioned constellation.

In accordance with the preferred embodiment, the constellations are further partitioned in accordance with a two-way set partition, defined by the bit Ib2 output from the puncture block 117. For simplification, only one such partition is illustrated in FIG. 9. It is readily verified that the Euclidean distance separating the nearest neighbors after the second partition level is the square root of thirty-two, or 5.65685. It is thus seen that after the partitioning, two constellation points remain in each quadrant, or a total of sixteen points. These points are selected/defined by the (three) uncoded bits 119. It will be appreciated that by coding the bits most susceptible to corruption (through noise or otherwise—e.g., the least significant bits), the coding gain of the illustrated embodiment achieves a sufficient coding, such that further coding need not be implement, and thus the complexity of the system may remain as simple as possible.

Figure 10A:
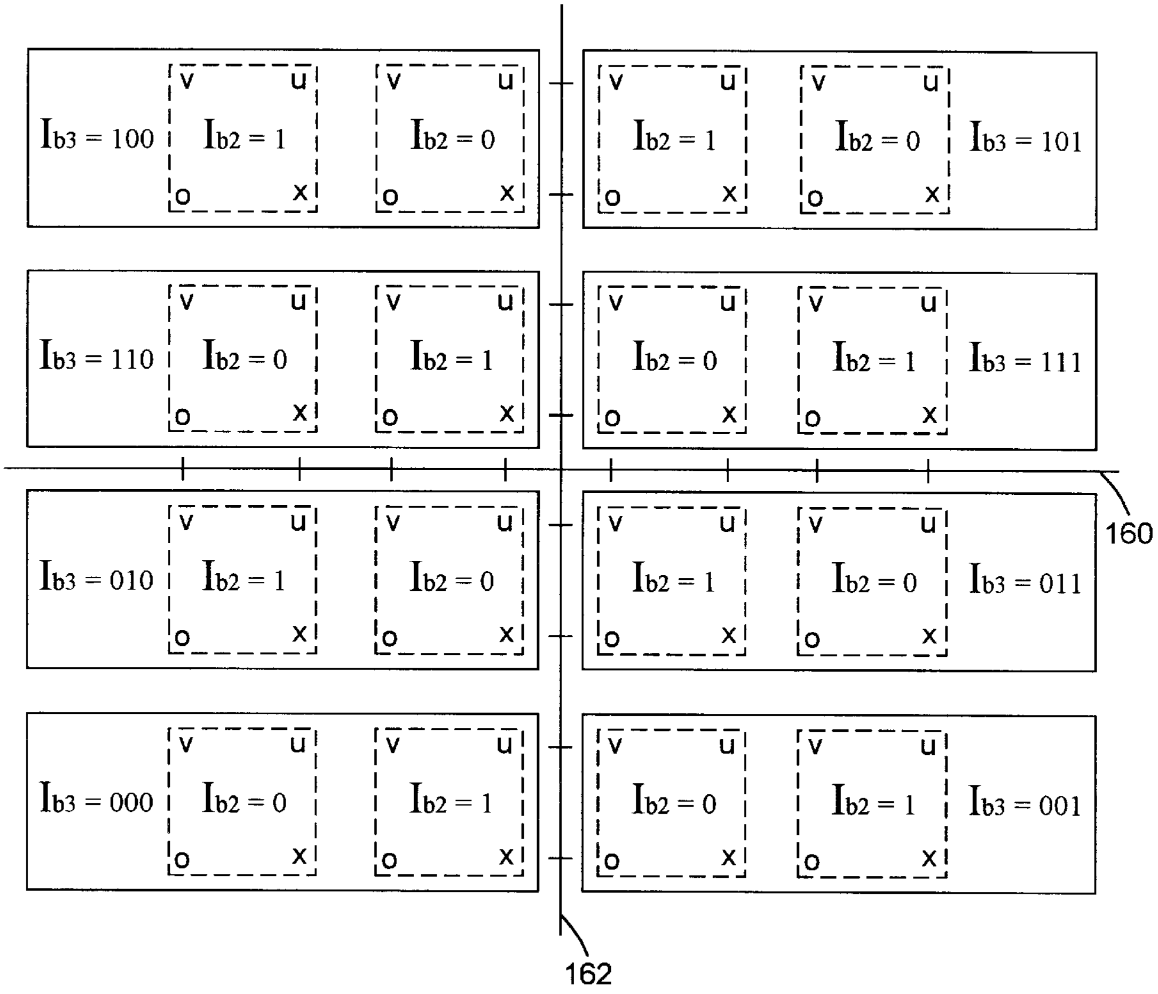
FIGS. 10A and 10B illustrate the assignment of Hamming codes to the 64 point CAP constellation of the illustrated embodiment.
Figure 10B:
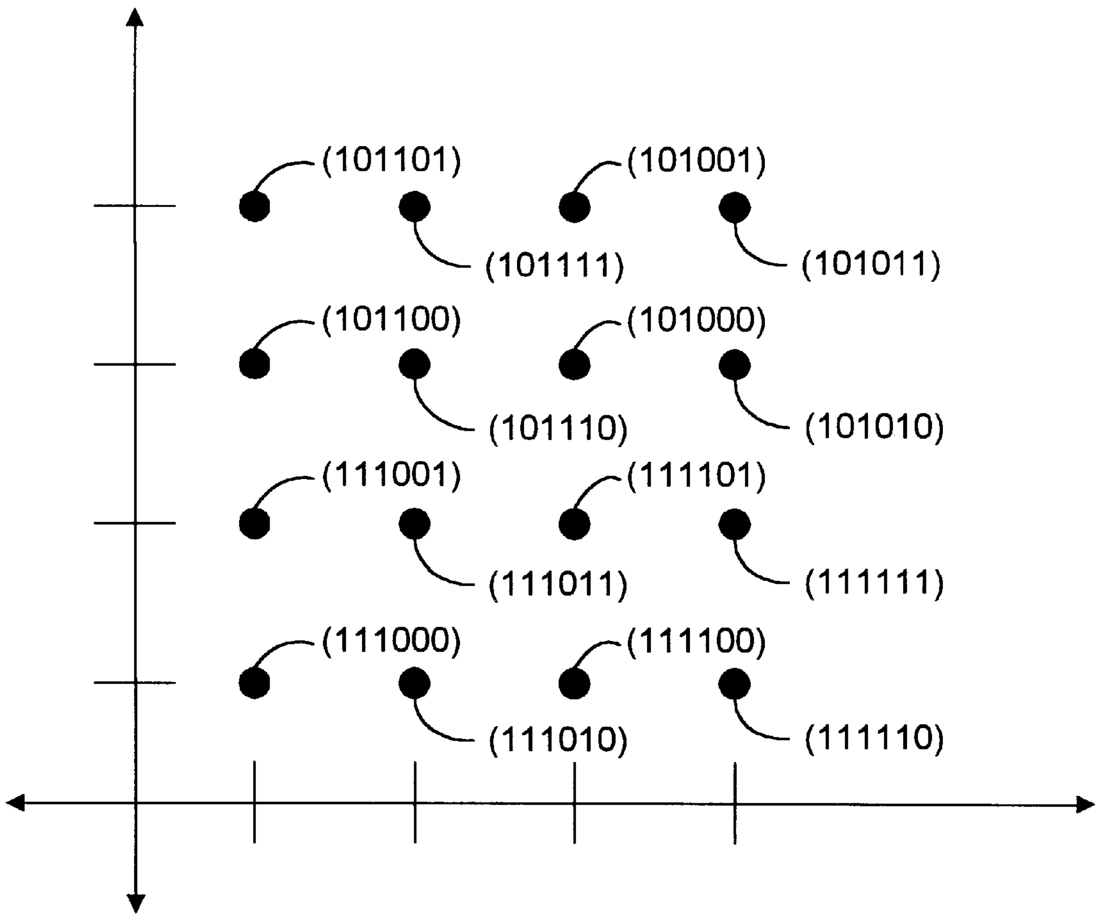

Reference is now made to FIGS. 10A and 10B, which illustrate the signal bits assigned to the various constellation points of the 64 point CAP constellation of the preferred embodiment. Specifically, FIG. 10A illustrates the Hamming Code assignments for the entire constellation, in relation to horizontal and vertical axes 160 and 162. The signal points are symbolically represented by the letters "o", "x", "v", and "u". Where the bits Ib1=00 denotes "o", Ib1=10 denotes "x", Ib1=01 denotes "v", and Ib1=11 denotes "u". The coded bit Ib2 is denoted within dashed-line squares, and the three uncoded bits 119 (Ib3) are specifically denoted within rectangular blocks. In the preferred embodiment the uncoded bits are assigned in accordance with Gray coding. Thus, for example, the top right-hand signal point (denoted by "u") is identified by the concatenation of Ib3=101, Ib2=0, and Ib1=11, or 101011. FIG. 10B illustrates the bits assigned to the top right-hand quadrant of the 64 point CAP constellation. These values can be readily verified by reference to FIG. 10A.

The article *On the Spectrum of Distances of a Multilevel Code, Decoded by a Multistage Decoder*, IEEE Transactions on Information Theory, Vol. 43, No. 5, Sep. 1997 (hereinafter referred to as "*On the Spectrum of Distances*"), authored by the inventor of the present invention, evaluated error rates contributed by the component codes in a multilevel code, decoded by a multistage decoder. These error rates are desired for estimating the performance of the structure, but more importantly, they can serve as a design tool for achieving high coding gain. The latter objective can be reached by approaching a balance among these error rates. For evaluating the error rate contributed by a component code, it is important to calculate the corresponding spectrum of Euclidean distances. A method for computing this spectrum was developed and described in *On the Spectrum of Distances*, and that method is utilized herein for evaluating the performance of the multilevel encoder of the present invention. The method is general and applicable to virtually any signal constellation, and convolutional as well as block component codes. Based on theoretical analysis and a computer simulation of the performance of the multilevel code of the illustrated embodiment, discussed below, it is shown that for BER=$10^{-7}$ the coding gain is 5.4 dB.

The mapping of the CAP symbols is determined by using a partition chain of two levels. The four-way+two-way partition chain is described above, where four way partitioning and two-way partitioning are employed at the first and second levels, respectively. The bits associate with the subsets and the minimum Euclidean distances among the signal points of the subsets are also provided in FIG. 9. In FIGS. 10A and 10B we present the complete mapping of 64-CAP, where two bits (which are associated with the first partition level) are labeled by Ib1, Ib2 is the bit associated with the second partition level, and Ib3 are three uncoded bits. Note that the uncoded bits were chosen in a way that creates an Hamming distance of one between any two neighbors groups of eight CAP symbols (See FIGS. 10A and 10B).

Performance

The following presents a brief mathematical verification of performance results, using the computational tools developed in *On the Spectrum of Distances*. To this end, let $\delta_j^{(i)}=\Delta_{i-1}\sqrt{d_j^{(i)}}$, where the set $\{\delta_j^{(i)}\}$ is the set of dominant Euclidean distances, associated with the i-th partition level. Let $s_k^{(i)}$, k=1,2, . . . ,$|S_i|$ (where $|S_i|$ is the number of signal points in $S_i$) be a symbol in the subset $S_i$ with the a-priori probability $P_k^{(i)}$ (given that the symbol belongs to the subset $S_i$). Let $\alpha_k^{(i)}$ be the number of neighbors of that symbol in the subset $S_i$−1. In *On the Spectrum of Distances* it was shown that the, BER contributed by the i-th partition level is closely upper bounded by the following union bound $$Pbi \le \sum B_k^{(i)} Q\left(\frac{\delta_k^{(i)}}{2\sigma}\right), \quad \text{Equation (2)}$$

where $$B_k^{(i)} = D_k^{(i)}\left[\sum_{j=1}^{|Si|} P_k^{(i)} a_j^{(i)}\right]^{d_k^{(i)}} \quad \text{Equation (3)}$$

where and $\{D_k^{(i)}\}$ is the set of error coefficients of the component code $C_i$, which can be found in the literature or easily computed. In case where all the signal points have the same a priori probability, $$B_k^{(i)} = D_k^{(i)}\left[\sum_{j=1}^{|Si|}\frac{1}{|Si|}a_j^{(i)}\right]^{d_k^{(i)}},\qquad \text{Equation (4)}$$

From Equation (4) it is deduced that for 64-CAP with four and two-way partitioning at the first and second level respectively, $$B_k^{(1)}=D_k^{(1)}175^{d_k(1)}, \text{ and } B_k^{(2)}=D_k^{(2)}3^{d_k(2)}. \qquad \text{Equation (5)}$$

Figure 11:
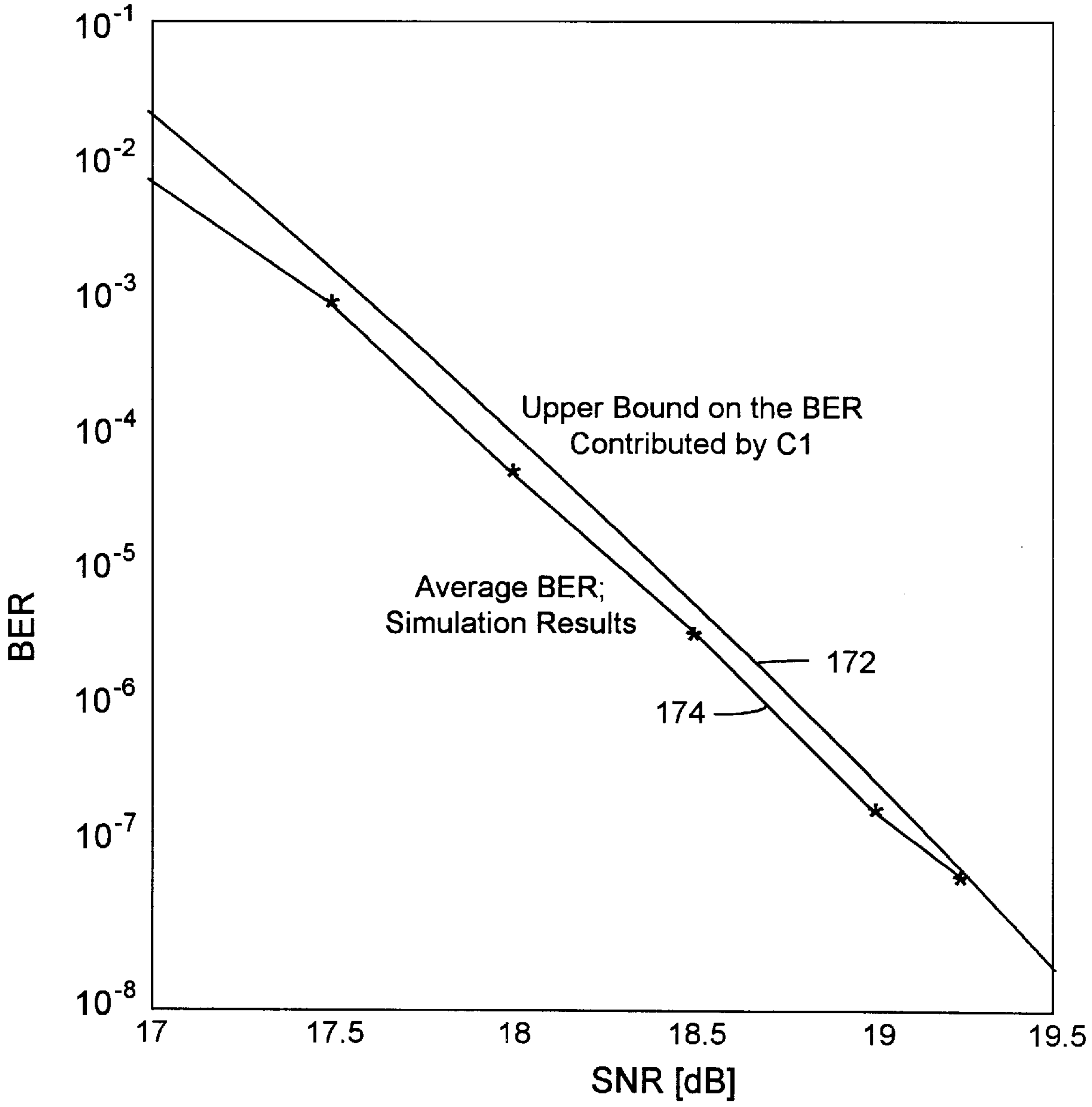
FIG. 11 is a computer generated plot illustrating simulation results comparing bit error rates as a function of the signal to noise ratio.

It is appreciated that the bits associated with the first partition level require the larger correction capability. Referring to FIG. 11, the error rate contributed by the first partition level, which is the dominant factor in the average BER for the multilevel code, is presented (reference numeral 172, suggested in this memorandum. Also shown are computer simulation results 174 for this coding scheme with a trace back of 42 branches (42 CAP's symbols) for the decoder $D_1$, and 65 branches (70 CAP's symbols) for $D_2$. Namely, a delay of 112 CAP symbols is needed. In case of 64-CAP the decoding delay for single pair HDSL (T1) is 356 $\mu$s. In FIG. 11, the simulation results are also presented. The simulation results are close to the union upper bound on the BER contributed by the first partition level. A signal to noise ration (SNR) of 19.2 dB is required in order to achieve an average BER of $10^{-7}$. An uncoded system with 32-CAP requires SNR=24.7 dB in order to obtain the same BER, namely a difference of 5.5 dB. Since the rate of the coded system is slightly smaller than 5 bits per symbol, the coding gain is 5.4 dB.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An encoder for providing a multilevel encoded signal comprising:

a device for presenting a plurality of information bits in parallel format;

a symbol selector having a plurality of inputs and an output, the symbol selector being configured to output a symbol that is defined by a signal constellation, whereby the symbol is defined by a magnitude and phase that are uniquely associated with a state of the plurality of inputs;

a first encoder having an input and an output, the input of the first encoder being associated with at least one of the outputs of the device and the output being associated with at least one of the inputs of the symbol selector, the first encoder being defined by a code, wherein the first encoder is configured to generate an output that defines a four-way set partition of the signal constellation; and a second encoder having an input and an output, the input of the second encoder being associated with at least one of the outputs of the device and the output being associated with at least one of the inputs of the symbol selector, the second encoder being defined by a code, wherein the second encoder is configured to generate an output that defines a two-way set partition of the signal constellation.

2. The encoder as defined in claim 1, wherein the device is a serial to parallel converter configured to receive information bits at an input in a serial format and deliver the information bits to the output in a parallel format.

3. The encoder as defined in claim 1, further including an output of the device being electrically connected with an input of the symbol selector.

4. The encoder as defined in claim 1, wherein the signal constellation is a 64 point CAP constellation.

5. The encoder as defined in claim 1, wherein the first encoder is a rate-half encoder.

6. The encoder as defined in claim 1, wherein the second encoder is a rate-half encoder.

7. The encoder as defined in claim 1, further including a puncture block disposed between the output of the second encoder and the symbol selector, the puncture block being configured to puncture the output of the second encoder.

8. The encoder as defined in claim 7, wherein the effective rate of the second encoder as modified by the puncture block is 13/14 rate.

9. The encoder as defined in claim 7, wherein the puncture block is defined by the following matrix:

$$\begin{bmatrix} 1\,1\,0\,0\,0\,1\,1\,0\,0\,0\,1\,0\,0 \\ 1\,0\,1\,1\,1\,0\,0\,1\,1\,1\,0\,1\,1 \end{bmatrix}.$$

10. The encoder as defined in claim 1, further including a puncture block disposed between the output of the first encoder and the symbol selector, the block configured to puncture the output of the first encoder.

11. The encoder as defined in claim 1, wherein the first encoder defines a parallel concatenated code.

12. A method for encoding signals for transmission across a communication channel comprising the steps of:

providing a plurality of information bits in parallel format for communication to a symbol selector;

directing a first group of the bits to a first encoder, the first encoder having a first output that is directed to the symbol selector;

directing a second group of the bits to a second encoder, the second encoder having a second output that is directed to the symbol selector;

using the first output to define a four-way set partition of a signal constellation; and using the second output to define a two-way set partition of the signal constellation.

13. The method as defined in claim 12, further including the step of directing a third group of the bits directly to the symbol selector.

14. The method as defined in claim 12, wherein the signal constellation is a 64 point CAP constellation.

15. The method as defined in claim 12, wherein the first encoder is a rate-half encoder.

16. The method as defined in claim 12, wherein the second encoder is a rate-half encoder.

17. The method as defined in claim 12, further including the step of puncturing the output of the second encoder before delivering that output to the symbol selector.

18. The method as defined in claim 17, wherein the effective rate of the second encoder as modified by the puncture block is 13/14 rate.

19. The method as defined in claim 17, wherein the step of puncturing is defined by the following matrix:

$$\begin{bmatrix} 1\,1\,0\,0\,0\,1\,1\,0\,0\,0\,1\,0\,0 \\ 1\,0\,1\,1\,1\,0\,0\,1\,1\,1\,0\,1\,1 \end{bmatrix}.$$

20. The method as defined in claim 12, further including the step of puncturing the output of the first encoder before delivering that output to the symbol selector.

21. The method as defined in claim 12, wherein the first encoder defines a parallel concatenated code.

* * * * *